June 15, 1965 D. A. POEPSEL ETAL 3,189,805
DIGITAL CONTROL APPARATUS HAVING ACTUAL-POSITION AND
ERROR COUNTERS FOR POSITIONING MACHINE MEMBERS
Filed May 20, 1960 2 Sheets-Sheet 1

WITNESSES:
Bernard R. Gieguey
James F. Young

INVENTORS
Donald A. Poepsel and
Charles A. Lauer.
BY
ATTORNEY

United States Patent Office 3,189,805
Patented June 15, 1965

3,189,805
DIGITAL CONTROL APPARATUS HAVING ACTUAL-POSITION AND ERROR COUNTERS FOR POSITIONING MACHINE MEMBERS
Donald A. Poepsel, Depew, and Charles A. Lauer, Eggertsville, N.Y., assignors to Westinghouse Electric Corporation, East Pittsburgh, Pa., a corporation of Pennsylvania
Filed May 20, 1960, Ser. No. 30,617
3 Claims. (Cl. 318—28)

The present invention relates in general to positioning control apparatus for a machine member, and more particularly to numerical positioning control apparatus for a machine tool member.

It is an object of the present invention to provide improved numerical position controlling apparatus for a machine member, which apparatus is more simple and suitable for use with any number system.

It is a different object of the present invention to provide improved position controlling apparatus for a machine member, which apparatus requires fewer component parts and is more suitable and faster operating relative to the time required for a given positioning operation.

It is an additional object of the present invention to provide improved numerical position controlling apparatus for a machine member, which apparatus is operative in an improved manner with a more advantageous number differencing apparatus arrangement to result in faster and more reliable positioning of the machine member from an actual position to a desired or reference position.

Further objects of the present invention will become apparent from the following description taken in conjunction with the accompanying drawings, wherein.

Figure 1:
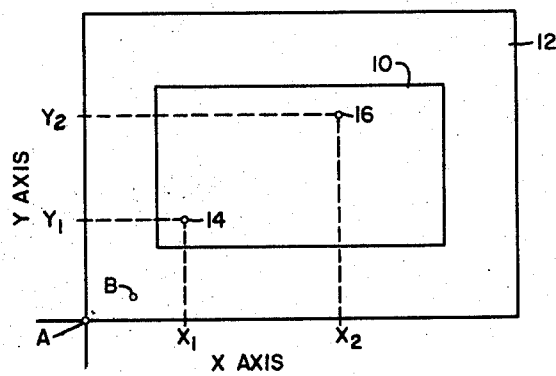
FIGURE 1 is a plan view of work piece apparatus showing a first or actual position of a machine member and a second reference or desired position for that machine member to be moved into.

In FIGURE 1 there is shown a work piece 10 positioned on a work table 12 or the like of a machine tool member, such as a drill press for purposes of illustration. It is assumed that a first hole 14 has been drilled at a position on the work piece 10 corresponding to the Y1 and X1 coordinates as shown in FIG. 1 relative to a reference point A. It is now desired that a second hole 16 be drilled at a coordinate position defined by Y2 and X2 as shown in FIGURE 1. For this purpose it is necessary that a first or Y axis control motor move either one of the table 12 or the drill mechanism along the Y axis from the position Y1 to the position Y2. Further it is desired that the second or X axis control motor move one of the table 12 or the drill mechanism along the X axis from the position X1 to the position X2. Thusly, the drill will be in position to complete the hole 16 at the coordinate location defined by Y2 and X2.

Figure 2:
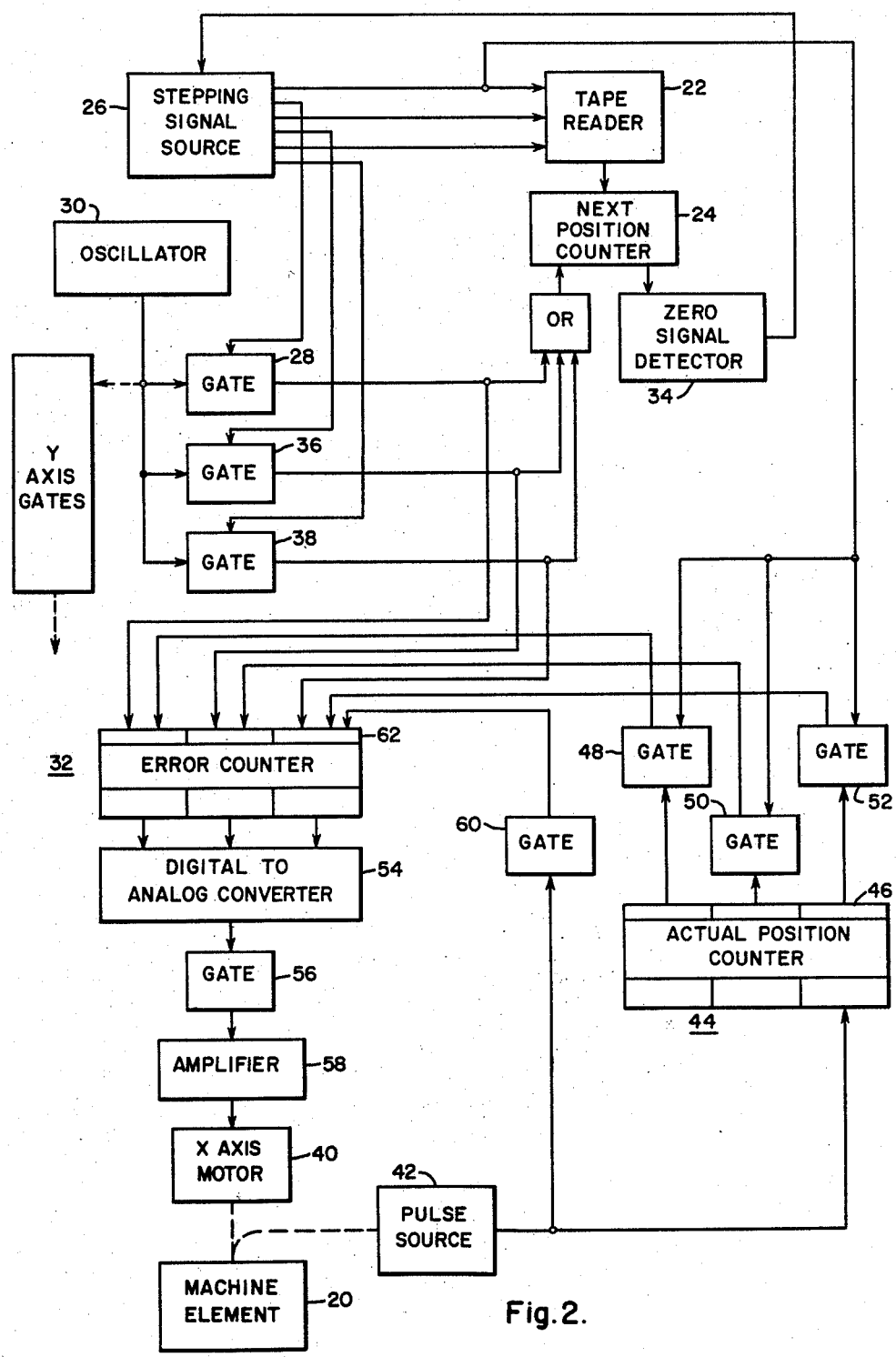
FIG. 2 is a schematic showing of the numerical positioning control apparatus in accordance with the teachings of the present invention.

In FIGURE 2 there is provided a schematic showing of the numerical positioning control apparatus in accordance with the present invention for the drill or table mechanism, which has been illustrated as the machine element 20. The desired position is supplied by a tape through a tape reader 22 in the form of a digital control signal such as for example a binary coded decimal signal which is supplied one digit at a time to a next position counter 24, in a sequence and manner determined by the stepping signal source 26. The latter stepping signal source 26 may comprise a mechanical stepping switch, although a static and electrical operating type device would more probably be provided in this regard. In the operation of the tape reader 22 and the next position counter 24, the most significant decade digit of the binary coded signal for the X axis motor for example is first supplied to the next position counter 24. More specifically, if it were desired to position the work piece to an X2 coordinate of 43.8, the stepping signal source 26 would be operative to cause the tape reader 22 first to supply the most significant decade signal 4 in the binary form of 0100 to the next position counter 24.

Next the stepping signal source would open the gate 28 to allow the output pulse signals from the oscillator 30 to count down this decade signal stored in the next position counter 24 and at the same time count into the error counter 32 the number of such pulse signals required to count down to zero this decade signal stored in the next position counter 24. The zero signal detector 34 senses the zero count condition of the next position counter 24, and advances the stepping signal source 26 to its next step operation to close the gate 28.

Now the tape reader 22 supplies the next decade signal 3 in binary form 0011 to the next position counter 24. Then the stepping signal source opens the gate 36 to allow the output pulse signals from the oscillator 30 to count down this decade signal stored in the next position counter 24 and at the same time count into the next decade stage of the error counter 32 the number of such pulses required to count down to zero this second decade signal stored in the next position counter. The zero signal detector 34 senses this zero count condition of the next position counter 24 and advances the stepping signal source 26 to its next step operation which closes the gate 36.

Now the tape reader 22 supplies the final decade signal 8 in the binary form 1000 to the next position counter 24. Then the stepping signal source 26 opens the gate 38 to count down this final decade signal as previously described and at the same time count into the final decade stage 62 of the error counter 32 this same final decade signal.

It should be understood that the present control apparatus is operative with positioning control signals having a considerably greater number of decade digits, and that the three digit signal 43.8 is for the purpose of example only.

Prior to the supplying of the counting signals from the oscillator 30 to the respective stages of the error counter 32, the latter error counter 32 as will be later explained was supplied a control signal in accordance with the actual position of the machine element 20 in the following manner. The machine element 20 is positioned by a suitable device such as a motor 40, which for the illustration of FIG. 2 we will assume is the X axis motor. The X axis motor 40 is also mechanically connected to a suitable pulse source 42, which may be in the form any one of several well known pulse sources readily available on the open market at the present time and which provides an output signal in accordance with a predetermined increment of travel movement of the machine element 20, such as every 0.1 inch of travel, or even every 0.001 inch of travel if desired. In other words, when the machine element 20 travels the predetermined distance of one tenth of an inch, a single pulse is supplied by the pulse source 42. There also may be provided by the pulse source an indication of the direction of movement of the machine element 20 by a change of signal polarity or even a separate polarity indicating signal. This is not shown in FIG. 2 in that as described the X axis motor 40 will move the machine element 20 only in a single direction and therefore the pulse source 42 need not provide an indication of whether or not the machine element 20 is moving in a direction relative to a reference point of greater distance or is moving in the opposite direction to lessen the distance relative to the reference point, such as the reference point A shown in FIGURE 1. The control pulses or signals from the pulse source 42 are supplied to an actual position counter 44 through the least significant stage 46 such that for each pulse supplied by the pulse source 42 the control signal stored in the actual position counter 44 will change by one magnitude or unit. Further, the actual position counter 44 is connected to the error counter 32 through the provided gates 48, 50 and 52 as shown in FIGURE 2 such that the control signal stored in each stage of the actual position counter 44 may be transferred into the corresponding stages of the error counter 32.

Thusly, it will be readily apparent that the error counter 32 receives a first control signal in accordance with the actual position of the machine element 20 through the actual position counter 44, and further receives a second control signal corresponding to the desired position signal supplied to the next position counter 24 through the operation of the oscillator 30 counting down the signal stored in the next position counter 24 one digit at a time and simultaneously changing the count stored in the error counter 32 in a corresponding manner.

Any difference between the actual position of the machine member 20 and the desired position for this machine member will result in an error or difference output signal from the error counter 32. The error counter 32, since it is a reversible type counter and since it receives the actual position signal as a count in a first direction and the desired position signal as a count in a second direction, will perform the necessary differencing operation. This error or difference signal from the error counter 32 is supplied to a digital to analog converter 54, which provides through a suitable gate circuit 56 and an amplifier 58 the necessary analog error signal to the X axis motor 40 for causing the machine element 20 to move the desired incremental change of distance along the X axis. As shown in FIG. 2 the control signals from the pulse source 42 are also supplied through a gate circuit 60 to the least significant stage 62 of the error counter 32 such that as the machine element 20 moves along the X axis, the control signals from the pulse source 42 change the count stored in both the actual position counter 44 and the error counter 32 in a manner to indicate the actual change in position of the machine element 20 and thereby to reduce the error or difference signal output of the error counter 32 accordingly to a zero value.

There now follows a similar operation of the present control apparatus relative to the desired coordinate position control signal for the position Y2 along the Y axis.

Figure 3:
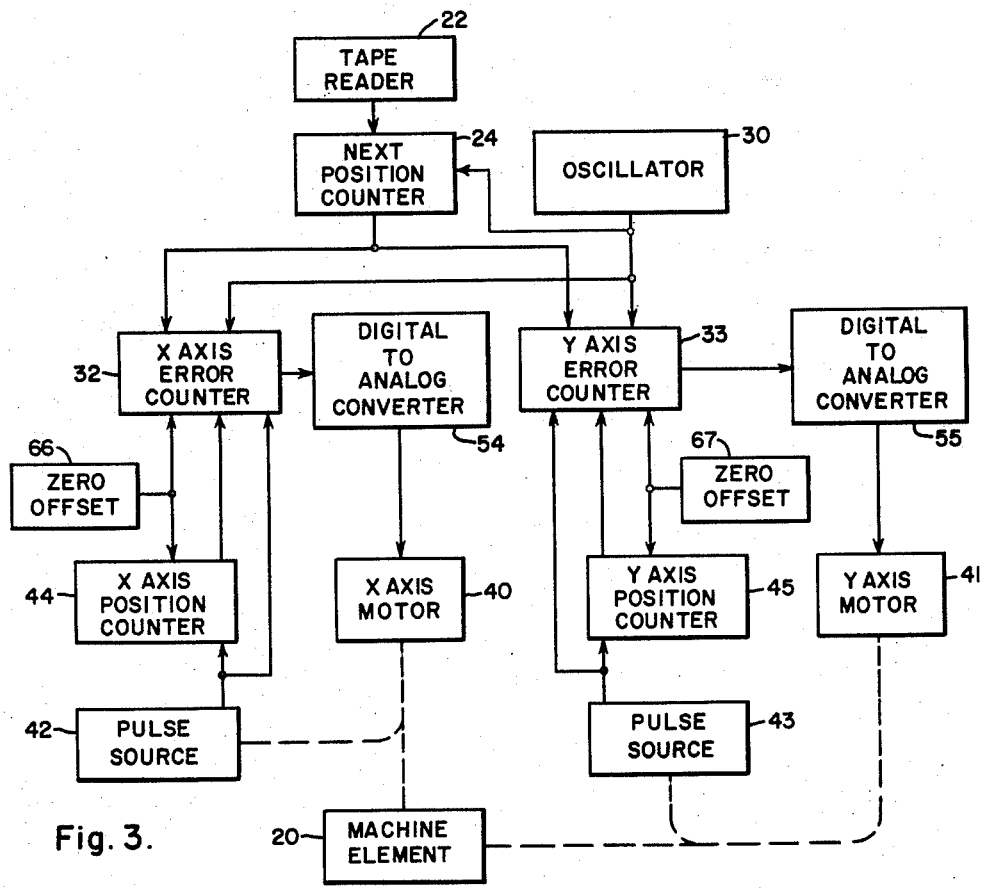
FIG. 3 is a diagrammatic showing of the position controlling apparatus of FIG. 2 and including control apparatus for controlling motion along both the X axis and the Y axis relative to the desired position.

In FIGURE 3, there is provided a diagrammatic showing of the control apparatus shown in FIGURE 2, wherein like numbers have been utilized to indicate similar control apparatus component elements. It will be noted relative to FIGURE 3, that the Y axis error counter 33 is operative with the oscillator 30 in a manner similar to the operation of the X axis error counter 32. The gating circuits are not shown in FIGURE 3.

The Y axis error counter 33 is operative as a reversible type counter and receives a control signal from the Y axis position counter 45 in accordance with the actual position of the machine element 20 along the Y axis as in turn determined by the output control signals for this purpose from the pulse source 43. Also, the Y axis error counter 33 receives the next or desired position control signal from the tape reader 22 through the operation of the next position counter 24 for the next Y coordinate position along the Y axis or the Y2 position for the illustration of FIGURE 1. The difference or error signal provided by the Y axis error counter 33 is supplied to a digital to analog converter 55 and thereafter to a Y axis motor 41 in a manner similar to the previously described operation of the X axis control apparatus as described relative to FIGURE 2.

In FIGURE 3 there is also shown a zero offset control signal source 66 operative with the X axis error counter 32 and the X axis position counter 44. Relative to the Y axis control apparatus there is shown a zero offset control signal source 67 operative with the Y axis error counter 33 and the Y axis position counter 45. The purpose of the zero offset signal sources 66 and 67 for their respective axes is to change the reference position from the position A to, for example, the position B as shown in FIGURE 1. The zero offset function per se is a well known control movement in the machine tool control art. The operation of the zero offset control signal source 66 for example is to subtract from the position counter 44 and simultaneously add to the actual position stored in the X axis error counter 32 the difference in coordinate along the X axis between the reference position A and the reference position B. Similarly the zero offset signal source 67 will subtract from the Y axis position counter 45 and add to the Y axis error counter 33 the difference in position between the reference point A and the reference point B along the Y axis. The polarity of the latter zero offset signals as described is necessary in that the reference point B involves a decrease in control signals required to position the machine member relative to the reference point B along both the X axis and the Y axis as compared to the control signals required for positioning the machine tool relative to the reference point A along both the X axis and the Y axis. Similarly, a shift of the zero position reference in the opposite direction would require the opposite polarity for the zero offset signals above described.

In the operation of the control apparatus as shown in FIGURE 2 the oscillator 30 is operative to count down any digit control signal stored in the next position counter 24 such that this digit control signal is thereby effectively transferred to a predetermined stage of the error counter 32 in the case of an X axis positioning signal. If the frequency of the oscillator 30 is in the order of 10 kilocycles and an actually operative or practical positioning signal included five decade digits, the maximum count required for each decade digit would be ten counting signals such that a maximum time period in the order of 1 millisecond would be required per decade digit to count down the largest practical X axis desired position control signal. It should be further noted that the provision of the zero signal detector 34 adds a greater accuracy and has several advantages over for example a procedure such as the counting to coincidence of the control signal decade digits. One reason for this is that it is easier to detect a zero count in a counter stage rather than to effect coincidence relative to some arbitrary count in the individual respective stages of the actual position counter 44.

Further, in the operation of the control apparatus as shown in FIGURES 2 and 3 it should be understood that each actual position of the machine element 20 is stored as a plural digit control signal in the actual position counter 44 for the X axis position and the same is true for the Y axis position counter 45 relative to the Y axis position. This control signal is relative to a zero reference point such as the point A shown in FIGURE 1. The actual position counter 44 for the X axis functions as an absolute position storage or recording device, while the error counter 32 is operative as an incremental or difference position storage or recording device.

Upon suitable command signal the tape is read to provide the next desired position control signal, for the X axis for example. This causes the X coordinate desired position control signal to be read into the next position counter 24 one digit at a time. It should be noted relative to FIGURE 2 that the command signal from the stepping signal source 26 which starts the reading of the most significant digit may also be operative to open the gates 48, 50 and 52 between the actual position counter 44 and the error counter 32 such that the actual position of the machine element 20 relative to the X axis may be registered in the error counter 32. Then the gate 28 opens, and the gates 48, 50 and 52 between the actual position counter 44 and the error counter 32 close. The operation of the oscillator 30 counts down the individual digits stored in the next position counter 24 and thereby counts into the respective stages of the error counter 32 relative to the corresponding digits of the actual position signal transferred from the actual position counter 44, and in this manner is operative to provide an error signal or difference signal output having a like number of digits from the error counter 32 to the digital to analog converter 54. The X axis motor 40 responds to the analog control signal corresponding to the difference or error digital control signal supplied to the digital to analog converter 54, and the machine element 20 is corrected in its position, while the pulse source 42 provides output signals to change the actual position control signal stored in the actual position counter 44 and also supplies control signals through the gate 60 to count down the difference or error control signal of the error counter 32. This process continues until the latter error signal is zero and the machine element 20 is in the desired X axis position.

Then a similar operation is repeated for the Y axis desired position control signal, with the counting signals from the oscillator 30 being operative to transfer the Y axis desired position control signal into the Y axis error counter 33 shown in FIGURE 3 in a manner similar to that previously described relative to the X axis error counter 32.

If desired the difference or error control signal of the X axis error counter 32 may be made operative through the gate 56 to cause the X axis motor 40 to be operative during the same time period that the respective digits of the Y axis desired position control signals are being stored in the next position counter 24 and being transferred to the Y axis error counter 33. The gate 56 shown in FIG. 2 can be opened when it is desired that the X axis motor 40 should operate. As an alternative operation, it may be desired to operate both the X axis motor 40 and the Y axis motor 41 simultaneously in which case the gate 56 of FIGURE 2 for the X axis motor 40 may be opened simultaneous relative to the opening of the corresponding gate for the Y axis motor 41.

When the control pulses from the pulse source 42 have counted out the total error or difference signal of the error counter 32 this will stop the movement of the X axis motor 40, and the same is true relative to the control pulses from the pulse source 43 counting out the difference or error signal of the error counter 33. The polarity of the control pulses from the pulse sources as the control pulses are supplied to the actual position counter and the error counters is such that the actual position counter registers the total net movement from the reference point zero. If it is desired to control the movement of the machine member 20 in both directions along the X axis as well as along the Y axis, a polarity control switch sensing the actual movement direction could be effective to suitably polarize the output control pulses. As zero is approached the digital to analog converters recognize the decreasing error signals and transmit suitable signals to the amplifier for the slow down of the X axis motor 40 and the Y axis motor 41 as may be desired.

The present application is related to a copending application entitled "Digital Control Apparatus" filed May 16, 1960, Serial No. 29,192 and assigned to the same assignee.

Although the present invention has been described with a certain degree of particularity, it should be understood that the present disclosure has been made only by way of example and that numerous changes in the details of construction and the combination and arrangement of parts may be resorted to without departing from the scope and spirit of the present invention. For example the present control apparatus is operative with any suitable binary number system, and not only the binary coded decimal system set forth in the description.

We claim as our invention:

1. In machine member position control apparatus comprising: means for producing a binary coded decimal signal representative of a desired machine member position; first counter means connected to said signal producing means for storing said desired position signal; gating means connected to said first counter means; means connected to said signal producing means to selectively apply gating signals to said gating means for effecting the transfer of the desired position signal from said signal producing means; error signal counter means; gating signal means for selectively applying further gating signals to said gating means for counting down to zero the signal stored in said first counter means and thereby providing said desired position signal to said error signal counter means; second counter means associated with said machine member for producing an actual position signal in said second counter means representative of the travel distance of said machine member; means for transferring the actual position signal to said error signal counter means; and means in said error signal counter means for comparing said actual position signal with said desired position signal to produce a position control signal.

2. In machine member position control apparatus including a motor and comprising: means for producing a binary coded decimal signal representative of a desired machine member position; first counter means connected to said signal producing means for storing said desired position signal; gating means connected to said first counter means; means connected to said signal producing means for transferring the desired position signal from said signal producing means and to selectively apply gating signals to said gating means for this purpose; error signal counter means; gating signal means for selectively applying further gating signals to said gating means for counting down the signal stored in said first counter means and providing said desired position signal to said error signal counter means; zero signal detecting means connected to said gating signal means for controlling the counting down of the signal stored in said first counter means; actual position signal counter means associated with said machine member for producing an actual position signal in said actual position signal counter means representative of the travel distance of said machine member; means for transferring the actual position signal to said error signal counter means; and means in said error signal counter means for comparing said actual position signal with said desired position signal to produce a position control signal for the energization of said motor.

3. In machine member position control apparatus comprising: means for producing a binary coded decimal signal representative of a desired machine member position; first counter means connected to said signal producing means for storing said desired position signal; gating means connected to said first counter means; means connected to said signal producing means to transfer the desired position signal from said signal producing means to said first counter means; error signal counter means; gating signal means for selectively applying gating signals to said gating means for counting down to substantially zero the signal stored in said first counter means and providing said desired position signal to said error signal counter means; second counter means associated with said machine member for producing an actual position signal to said second counter means representative of the travel distance of said machine member; means for transferring the actual position signal to said error signal counter means in opposition to said desired position signal; and means in said error signal counter means for comparing said actual position signal with said desired position signal to produce a position control signal.

References Cited by the Examiner

UNITED STATES PATENTS

| | | | |
|---|---|---|---|
| 2,828,482 | 3/58 | Schumann | 340—187 X |
| 2,873,439 | 2/59 | Lahti | 340—187 X |
| 2,886,753 | 5/59 | Abbott | 340—147 |
| 2,985,368 | 5/61 | Kohler | 235—92 |
| 3,002,115 | 9/61 | Johnson et al. | 340—147 |

NEIL C. READ, *Primary Examiner.*

L. MILLER ANDRUS, *Examiner.*